United States Patent [19]
Kinder

[11] 3,983,832
[45] Oct. 5, 1976

[54] PLANING SKI CONVERSION TO STAND-OFF ARMOR

[75] Inventor: Floyd A. Kinder, Ridgecrest, Calif.

[73] Assignee: The United States of America as represented by the Secretary of the Navy, Washington, D.C.

[22] Filed: July 18, 1975

[21] Appl. No.: 597,854

[52] U.S. Cl. ............................. 115/1 R; 9/310 R; 114/66.5 H
[51] Int. Cl.² ........................................... B60F 3/00
[58] Field of Search ............... 115/1 R, 70, 1 B; 9/310 R, 310 A, 310 B, 310 C, 310 E; 114/66.5 R, 66.5 H, 123; 180/1 H, 5 R; 280/8, 9

[56] References Cited
UNITED STATES PATENTS

| 1,355,937 | 10/1920 | Brosnan | 114/123 |
| 2,400,132 | 5/1946 | Porter | 114/66.5 H |
| 2,453,149 | 11/1948 | McCutchen | 115/1 B |
| 2,514,488 | 7/1950 | Hale et al. | 115/1 R |
| 3,456,611 | 7/1969 | Johnson | 114/66.5 H |
| 3,486,477 | 12/1969 | Pender | 115/1 R |
| 3,521,566 | 7/1970 | Veldhuizen | 115/1 R |

FOREIGN PATENTS OR APPLICATIONS

| 1,535,105 | 6/1968 | France | 115/1 R |

Primary Examiner—Trygve M. Blix
Assistant Examiner—Charles E. Frankfort
Attorney, Agent, or Firm—R. S. Sciascia; Roy Miller; Gerald F. Baker

[57] ABSTRACT

An amphibious vehicle is provided with pivoted plates on either side for movement between an extended position approximately horizontal and a "folded" position approximately vertical with respect to the normal position of the vehicle. A third plate may also be attached beneath and parallel to the bottom of the vehicle. These plates are so shaped that in the extended position they serve as planing skis and are fabricated from a material which will afford armor protection to the vehicle when the plates are in the folded or retracted position.

9 Claims, 4 Drawing Figures

PLANING SKI CONVERSION TO STAND-OFF ARMOR

BACKGROUND OF THE INVENTION

This invention relates to amphibious vehicles and more particularly to amphibious vehicles which are used as landing craft and most specifically to armored assault craft, for example, for military purposes.

The present invention may be advantageously utilized, for example, with the amphibious cargo carrier disclosed in assignee's prior U.S. Pat. No. 2,456,542 issued Dec. 4, 1948 to B. A. Swennes. Such assault craft are displacement vehicles which are slow in water, having a speed of around 8 knots.

SUMMARY

According to the present invention with the addition of planing surfaces on either side of the craft, speeds of up to 50 knots or more may be obtainable depending upon the payload. Additionally, these planing surfaces are advantageously constructed of anti-brisance material and when retracted are designed to act as stand-off armor in the retracted position when the craft reaches the beach and is operated on land.

DESCRIPTION AND OPERATION

Figure 1:
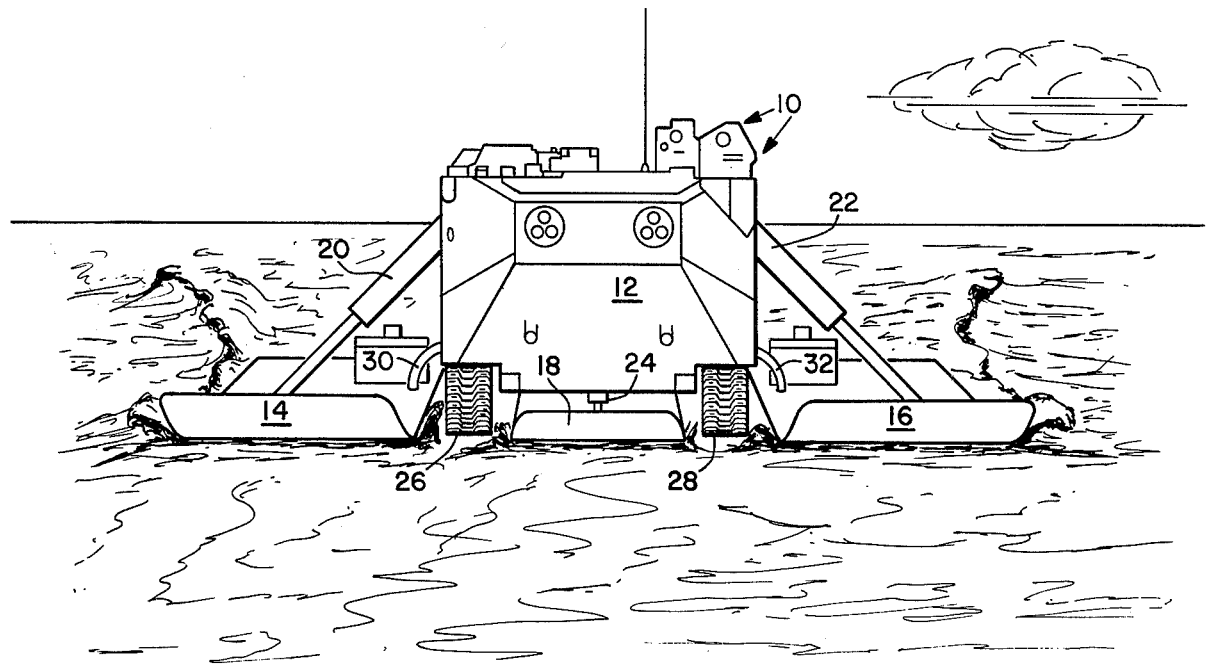
FIG. 1 is front elevational view of an amphibious vehicle according to the present invention with the planing skis extended.

The amphibious vehicle generally indicated at 10 in FIG. 1 comprises a conventional amphibious vehicle body 12 to which has been added planing skis or plates 14, 16, and 18 on the right and left sides of the vehicle body and the bottom thereof respectively. These skis or plates are connected to the vehicle body 12 by means of telescoping hydraulic struts 20, 22, and 24 respectively. The attachment of plates 14 and 16 may also include hinged or sliding stabilizing fittings 30 and 32 respectively.

When the planing skis or plates 14, 16, and 18 are extended as shown in FIG. 1, they effectively form planing ski surfaces designed to facilitate the movement of the vehicle across the water. Propulsion is accomplished in the usual manner by plates or cleats on the drive tracks 26, 28 and steering is generally by selective braking the drive tracks. The prime mover, the propulsion means and the steering of these amphibious vehicles may be better understood by reference to the prior U.S. Pat. No. 2,456,542 referenced above.

In some applications it may be advisable to include propulsion assist units on the side plates as indicated at 34, 36. For example, expendable and jettisonable reaction motors may be used to accomplish the initial thrust necessary to boost the vehicle from the displacement mode to the planing mode of operation.

Figure 2:
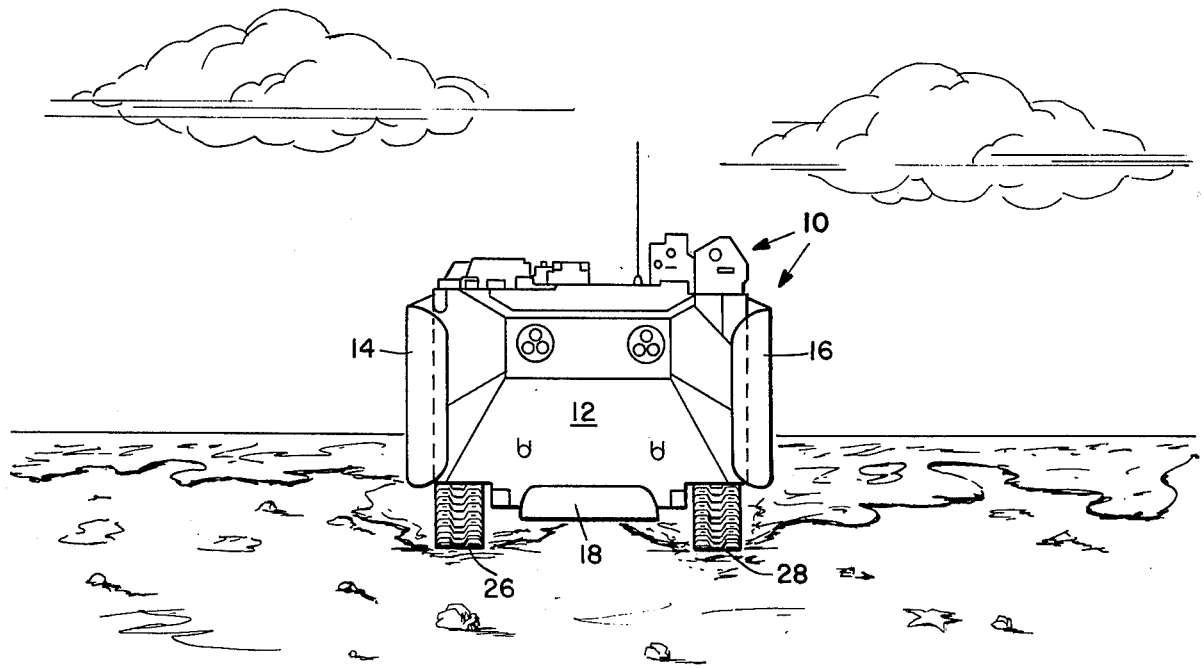
FIG. 2 is a view similar to FIG. 1 with the planing skis in retracted position.

FIG. 2 shows the vehicle of FIG. 1 after it has reached the beach and is proceeding on land. The plates 14, 16 and 18 have been retracted to a position spaced from and generally parallel to the sides and bottom of the vehicle respectively and the tracks 26, 28 are engaging the ground.

Figure 3:
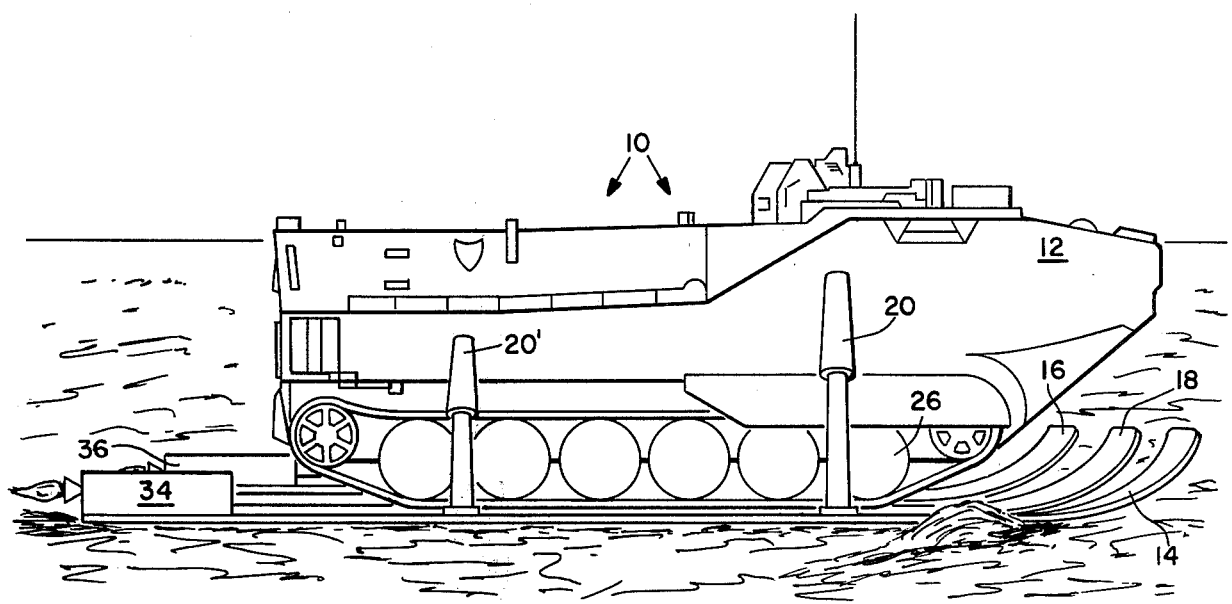
FIG. 3 is a side elevation of the vehicle in the FIG. 1 configuration.

As shown in FIG. 3, the forward ends of the planing skis 14, 16 and 18 are curved slightly and are preferably connected to the body 12 by a plurality of telescoping haudraulic struts as illustrated at 20 and 20'.

Figure 4:
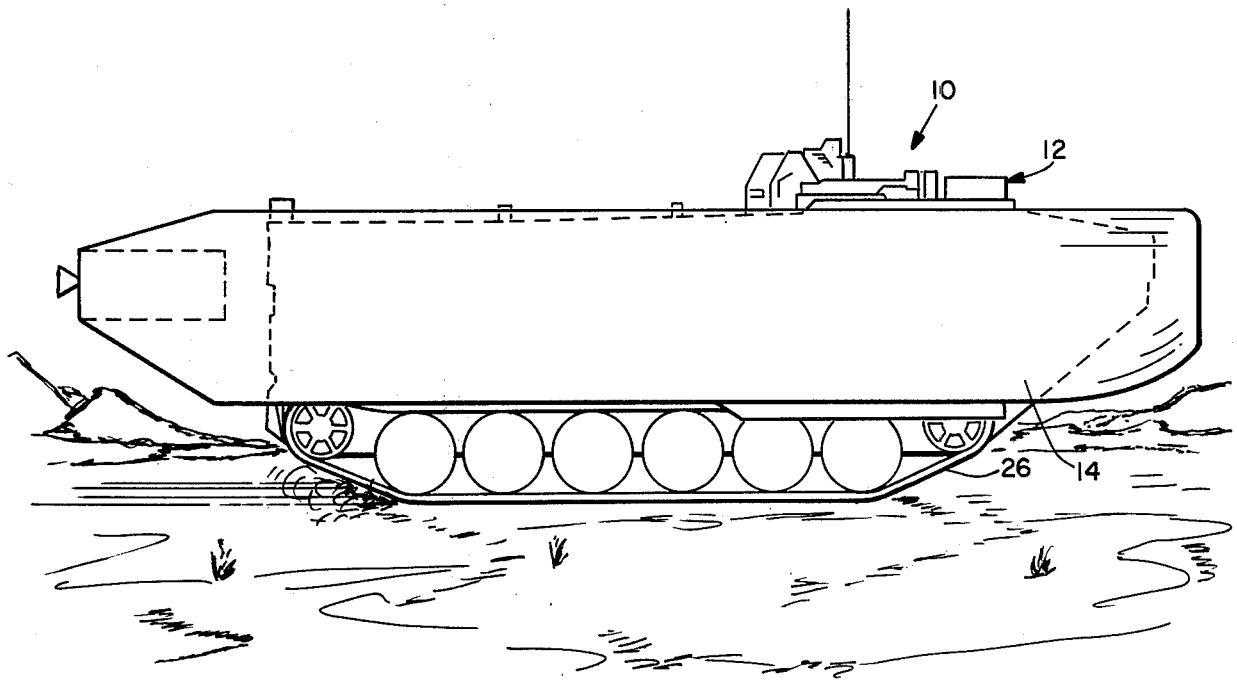
FIG. 4 is a side elevation of the vehicle in the FIG. 2 configuration.

As will be seen in the FIG. 4 view of the vehicle, the side plates when in the retracted position, shield the entire sides of the cargo area of the vehicle. These side plates along with the bottom plate 18 are preferably constructed of anti-brisance materials and form a standoff armor that is very effective against most weapons encountered from their respective directions in the usual landing operation. In fact, this type of armor may be sufficiently effective that the normal armored sides of the vehicle may be reduced in thickness and the total weight of the reduced sides and the stand-off armor may, therefore, compare favorably with the weight of the vehicle without the planing skis.

Even though the reduction in the usual armored sides might make the craft more vulnerable in approaching the beach, the greater speed obtainable with the planing ski construction would offset the danger by making the vehicle less of a target for a shorter period of time.

The planing skis of course need not be made from steel or other ferrous metal but may be made from a laminated plastic armor plate or the like and may include honeycomb or other similar construction which will add buoyancy to the vehicle in the extended configuration when in the marine environment.

The illustration of the planing ski and armor construction of the invention in connection with a particular vehicle is not intended to limit the scope of the invention to such a vehicle and it should be understood that the arrangement may be equally applicable to other vehicles including other propulsion systems and also including surface effect vessels.

What is claimed is:

1. In an amphibian vehicle the combination of a watertight vehicle body having a cargo space therein;
   means for propelling the vehicle either over land or through the water, and
   a plurality of planar plates of sheet material fastened to portions of said body for extension and retraction with respect thereto,
   said planar surfaces including first and second side plates substantially coextensive with the sides of the body of the vehicle and being hinged thereto for movement from a first retracted position spaced from and parallel to the sides of said vehicle to a second extended position wherein said plates are orthogonal to said sides and substantially parallel to the bottom portion of the vehicle and coplanar to each other; and
   a planar surface attached to the bottom of said vehicle for movement between a retracted position closely spaced from the bottom of said vehicle and an extended position which is coplanar with the side plates in their extended position.

2. The vehicle of claim 1 further including said plates being fabricated of an armor material and in the retracted position serving the additional function of stand-off armor protection.

3. The vehicle of claim 1 further including said plates being fabricated of anti brisance material in a cellular construction which adds boyancy to the vehicle in the extended position and armor protection the retracted position.

4. The vehicle of claim 1 further including auxilliary propulsion means on each said side plate.

5. The vehicle of claim 4 wherein said auxilliary propulsion means include a plurality of self contained, jettisonable reaction motors.

6. The vehicle of claim 5 further including said plates being fabricated of an armor material and in the retracted position serving the additional function of stand-off armor protection.

7. The vehicle of claim 5 further including said plates being fabricated of anti brisance material in a cellular construction which adds buoyancy to the vehicle in the extended position and armor protection in the retracted position.

8. The vehicle of claim 4 further including said plates being fabricated of an armor material and in the retracted position serving the additional function of stand-off armor protection.

9. The vehicle of claim 4 further including said plates being fabricated of anti brisance material in a cellular construction which adds buoyancy to the vehicle in the extended position and armor protection in the retracted position.

* * * * *